United States Patent [19]

Suzuki et al.

[11] 4,205,234

[45] May 27, 1980

[54] INTENSIFYING SCREENS

[75] Inventors: Yujiro Suzuki, Odawara; Keiji Shimiya; Takashi Miyagawa, both of Hiratsuka, all of Japan

[73] Assignee: Kasei Optonix, Ltd., Tokyo, Japan

[21] Appl. No.: 870,016

[22] Filed: Jan. 16, 1978

[30] Foreign Application Priority Data

Jan. 17, 1977 [JP] Japan .................................. 52-3697

[51] Int. Cl.[2] .............................................. G01J 1/58

[52] U.S. Cl. .................................. 250/483; 250/486

[58] Field of Search ........................ 250/486, 487, 483

[56] References Cited

U.S. PATENT DOCUMENTS

| | | | |
|---|---|---|---|
| Re. 21,216 | 9/1939 | Eggert et al. | 250/487 |
| 2,113,090 | 6/1939 | McKeag | 250/483 |
| 2,476,619 | 7/1949 | Nicoll | 250/486 |
| 2,774,682 | 12/1956 | Larach | 250/483 |
| 2,895,917 | 7/1959 | Gaunt | 250/483 |
| 2,921,201 | 1/1960 | Lieb | 250/483 |
| 3,023,313 | 2/1962 | DeLaMater et al. | 250/487 |
| 3,253,146 | 5/1966 | DeVries | 250/487 |
| 3,936,644 | 2/1976 | Rabatin | 250/486 |
| 4,028,550 | 6/1977 | Weiss | 250/483 |

*Primary Examiner*—Harold A. Dixon
*Attorney, Agent, or Firm*—Gerald J. Ferguson, Jr.; Joseph J. Baker

[57] ABSTRACT

A radiographic intensifying screen having high radiographic image quality is composed of a support and a fluorescent layer formed on the support. The fluorescent layer contains a pigment coated phosphor in which pigment particles adhere to the surface of the phosphor and partly absorb the light emitted by the phosphor.

5 Claims, 2 Drawing Figures

INTENSIFYING SCREENS

BACKGROUND OF THE INVENTION

1. Field of the Invention

The present invention relates to a radiographic intensifying screen (hereinafter referred to as "intensifying screen"), and more particularly to an intensifying screen having a fluorescent layer containing a pigment coated phosphor which exhibits excellent radiographic image quality (hereinafter referred to as "image quality").

2. Description of the Prior Art

Radiography is generally classified into two types, viz., medical radiography used for medical diagnosis and industrial radiography used for nondestructive inspection of industrial materials. In both types, the intensifying screen is used in face contact with a radiographic film (hereinafter referred to as "film") to increase the sensitivity of the radiographing system. The intensifying screen is essentially composed of a support such as paper or plastic and a fluorescent layer formed thereon. The fluorescent layer is usually further covered with a transparent protective layer such as polyethylene terephthalate film, acetylcellulose film, polymethacrylate film, nitrocellulose film, etc. The fluorescent layer is composed of a phosphor dispersed in a suitable resinous binder. Some intensifying screens have a reflective layer or an absorptive layer between the support and the fluorescent layer. Further, some intensifying screens used for nondestructive inspection of industrial materials have a metallic foil between the support and the fluorescent layer. In a radiographing system it is important that the intensifying screen should have high image quality and high speed.

SUMMARY OF THE INVENTION

The object of the present invention is to provide an intensifying screen for radiographs having high image quality.

That is, the object of the present invention is to provide an intensifying screen for radiographs having improved sharpness and granularity which permits enhanced precision in diagnosis in medical radiography and provides improved resolution in industrial radiography.

As the result of investigation of the fluorescent layers of intensifying screens, the inventors have discovered that the sharpness and granularity of intensifying screens can be improved by using a pigment coated phosphor in the fluorescent layer.

That is, according to the present invention, there is provided an intensifying screen comprising a support having applied thereon a fluorescent layer containing a pigment coated phosphor in which pigment particles adhere to the surface of the phosphor and partly absorb the light emitted by the phosphor.

The above and other objects, features and advantages of this invention will be made apparent from the detailed description thereof taken in conjunction with the accompanying drawings.

DETAILED DESCRIPTION OF THE INVENTION

Figure 1:
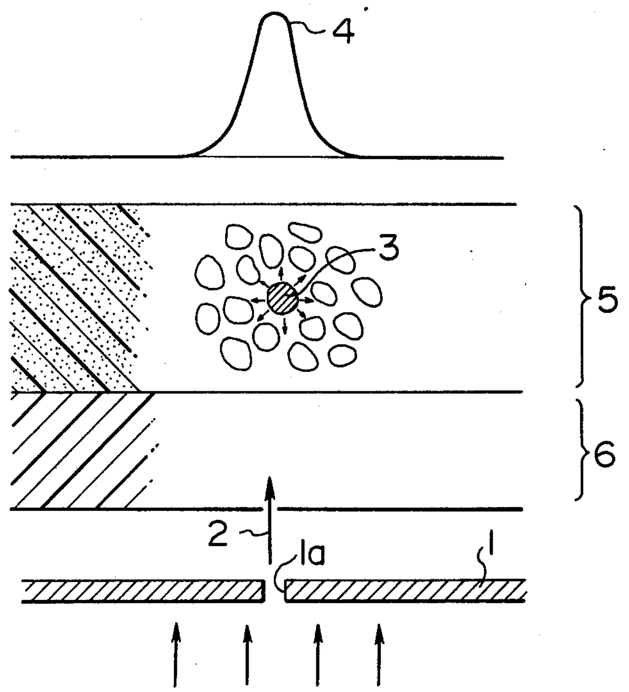
FIG. 1 is a schematic representation illustrating the blur phenomenon in the fluorescent layer of an intensifying screen.

The blur phenomenon in an intensifying screen is illustrated in FIG. 1. As shown in FIG. 1, when an incident X-ray flux 2 passes through the slit 1*a* of a lead plate 1 and excites a phosphor particle 3 in a fluorescent layer 5, the light emitted by the phosphor particle 3 scatters in all directions as shown by arrows. The scattering light results in an output light having an enlarged cross-section as represented by a distribution curve 4 due to reflections and refractions caused by the surfaces of the phosphor particles around said phosphor particle 3.

The aforementioned reflections by the surfaces of the phosphor particles are reduced in accordance with the present invention by using pigment coated phosphor particles in which pigment particles adhere to the surfaces thereof and absorb the light emitted thereby, whereby the quantity of light advancing in the directions not perpendicular to the surface of the intensifying screen and having a long optical path to the surface of the intensifying screen is markedly reduced. Thus, by using a pigment coated phosphor, the cross-section of the output light is reduced and the sharpness of the intensifying screen is improved.

Figure 2:
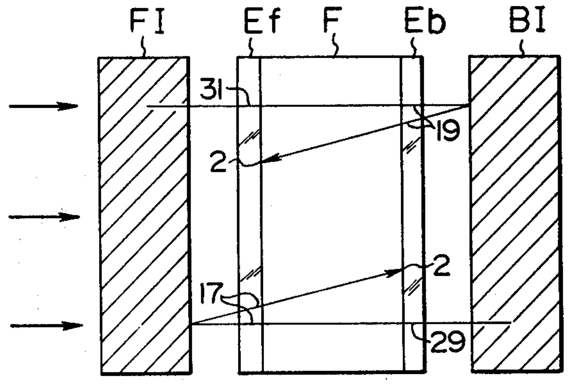
FIG. 2 is a schematic representation illustrating the cross-over effect in a radiographing system consisting of a pair of intensifying screens and a film sandwiched therebetween.

Further, the sharpness of an intensifying screen is reduced by the cross-over effect in the radiographing system. The cross-over effect in the radiographing system is illustrated in FIG. 2. As shown in FIG. 2, in an ordinary radiographing system, a film comprising a film base F and emulsion layers Ef and Eb formed on opposite surfaces of the film base F is used together with a pair of intensifying screens, that is, front side intensifying screen (FI) and back side intensifying screen (BI), which sandwich the film therebetween. The light beams emitted by the intensifying screen FI (BI) impinge upon not only the emulsion layers Ef (Eb) in face contact with the surface of the intensifying screen FI (BI), but also the opposite side emulsion layer Eb (Ef) after passing through the film base F. Moreover, the light beams which have passed through the opposite side emulsion layer Eb or Ef are reflected by the surface of the intensifying screen BI or FI on the opposite side, and again pass through the film base F and impinge upon the emulsion layer Ef or Eb of the film F in face contact with the surface of said intensifying screen FI or BI. The sharpness of the intensifying screen is reduced by the aforementioned cross-over effect. The numerals shown in FIG. 2 indicate the percentages of the amount of whole light which impinge upon the emulsion layers Ef and Eb in a radiographing system consisting of a high sharpness type intensifying screen FS (made by Dai Nippon Toryo Co., Ltd.) and RX X-ray film (made by Fuji Photo Film Co., Ltd.) It is apparent from FIG. 2 that about 40% of the amount of light emitted by the intensifying screen FI (19% of the amount of whole light) impinges upon the opposite side emulsion layer Eb and moreover about 10% of the amount of said light impinging upon said emulsion layer Eb impinges upon the emulsion layer Ef in face contact with the surface of the intensifying screen FI by the reflection at the surface of the intensifying screen BI.

In accordance with the present invention, by using pigment coated phosphor particles in which pigment particles adhere to the surfaces thereof and absorb the light emitted thereby, the aforementioned reflections of light at the surfaces of the intensifying screens FI and BI are markedly reduced, and moreover re-reflections by the surfaces of the intensifying screens FI and BI of the light reflected by the surfaces of the emulsion layers Ef and Eb toward the intensifying screens FI and BI are markedly reduced, whereby the sharpness is enhanced. The cross-over effect is easily diminished by constituting the surface of the fluorescent layer (on the opposite side of the support) with the pigment coated phosphor particles.

In high speed type intensifying screens using phosphors such as $Y_2O_2S$:Tb phosphor, $Gd_2O_2S$:Tb phosphor, LaOBr:Tb phosphor, BaFCl:$Eu^{2+}$ phosphor and the like in the fluorescent layer, the amount of the incident X-ray can be reduced. However, when the amount of the incident X-ray is reduced, the number of X-ray quanta reaching the X-ray film decreases, which results in degradation of the granularity of the intensifying screen. The degradation of granularity can be prevented in accordance with the present invention by using pigment coated phosphor particles in the phosphor layer and decreasing the amount of the output light emitted by said phosphor layer.

As mentioned above, the intensifying screen of the present invention having a fluorescent layer containing a pigment coated phosphor exhibits improved sharpness and granularity, that is, high image quality. Inevitably, the speed of the intensifying screen in accordance with the present invention is lower than that of intensifying screens having a fluorescent layer containing a conventional phosphor because the amount of the output light emitted by the pigment coated phosphor is smaller than that of the conventional phosphor. The lowering of the speed of the intensifying screen, however, can be prevented to some extent by constituting the fluorescent layer with two or more layers of different kinds of pigment coated phosphors in which different amounts of pigment particles are adhered to the surfaces of the phosphor particles (including the case where some of the particles are conventional phosphor particles having no pigment particles adhering to the surface thereof). That is, by constituting the fluorescent layer with a plurality of layers in which the uppermost layer, i.e. the layer on the opposite side of the support, contains phosphor particles to which the largest amount of the pigment particles adhere, the next to the uppermost layer contains phosphor particles to which the second largest amount of the pigment particles adhere and the lower layers contain phosphor particles to which a less amount of the pigment particles adhere, an intensifying screen having a higher speed than that of the intensifying screen bearing only one fluorescent layer equivalent to said uppermost layer can be obtained. It should be noted that the phosphor particles in the lowermost layer in the above described plurality of layers may be of the type to which no pigment particles adhere.

Tables 1 and 2 show the sharpness, granularity and speed of the intensifying screens in accordance with the present invention (No. 1–4) in comparison with that of the conventional intensifying screen (No. 5). Each intensifying screen of the present invention mentioned in Table 1 has a fluorescent layer containing cobalt blue pigment coated $CaWO_4$ phosphor particles, and each intensifying screen of the present invention mentioned in Table 2 has a fluorescent layer containing cobalt blue pigment coated $Y_2O_2S$:Tb phosphor particles. In the Tables 1 and 2, all the intensifying screens have the same coating weight of 40 mg/cm$^2$. Intensifying screens No. 1 and No. 2 have only one fluorescent layer which contains pigment coated phosphor particles. Intensifying screens No. 3 and No. 4 have a fluorescent layer consisting of two layers, that is, an upper layer and a lower layer. The upper layer contains pigment coated phosphor particles, and the lower layer contains conventional phosphor particles in which no pigment particles adhere to the surfaces of the phosphor particles. In the Tables 1 and 2, the sharpness is shown by MTF value at a spacial frequency of 2 lines/mm, the granularity is shown by RMS value at a radiographic density of 0.8 and a spacial frequency of 0–5 lines/mm, and the speed is shown by a relative value with reference to that of the conventional intensifying screen defined to be 100.

Table 1

Image Quality and Speed of Intensifying Screens using Cobalt Blue Pigment Coated $CaWO_4$ Phosphor Particles in the Fluorescent Layer

| No. | | amount of pigment particles (weight %) | coating weight of fluorescent layer (mg/cm$^2$) | sharpness (MTF value) | granularity (RMS value) | relative speed (%) |
|---|---|---|---|---|---|---|
| 1 | | 1.0 | 40 | 0.64 | $1.01 \times 10^{-1}$ | 77 |
| 2 | | 2.0 | 40 | 0.65 | $1.00 \times 10^{-1}$ | 64 |
| 3 | upper layer | 1.0 | 10 | 0.63 | $1.02 \times 10^{-1}$ | 98 |
| | lower layer | 0 | 30 | | | |
| 4 | upper layer | 2.0 | 10 | 0.64 | $1.01 \times 10^{-1}$ | 96 |
| | lower layer | 0 | 30 | | | |
| 5 | | 0 | 40 | 0.55 | $1.05 \times 10^{-1}$ | 100 |

Table 2

Image Quality and Speed of Intensifying Screens using Cobalt Blue Pigment Coated $Y_2O_2S$:Tb Phosphor Particles in the Fluorescent Layer

| No. | | amount of pigment particles (weight %) | coating weight of fluorescent layer (mg/cm$^2$) | sharpness (MTF value) | granularity (RMS VALUE) | relative speed (%) |
|---|---|---|---|---|---|---|
| 1 | | 0.5 | 40 | 0.53 | $1.22 \times 10^{-1}$ | 70 |
| 2 | | 4.5 | 40 | 0.56 | $1.13 \times 10^{-1}$ | 35 |
| 3 | upper layer | 0.5 | 10 | 0.52 | $1.25 \times 10^{-1}$ | 82 |
| | lower layer | 0 | 30 | | | |
| 4 | upper layer | 4.5 | 10 | 0.55 | $1.20 \times 10^{-1}$ | 54 |
| | lower layer | 0 | 30 | | | |
| 5 | | 0 | 40 | 0.45 | $1.40 \times 10^{-1}$ | 100 |

It is clear from Tables 1 and 2 that the intensifying screens of the present invention having a fluorescent layer containing a pigment coated phosphor (No. 1–No. 4) exhibit improved sharpness and granularity, that is, higher image quality than the conventional intensifying screen (No. 5). It is also clear from a comparison of the intensifying screens No. 1 and No. 2 and a comparison of the intensifying screens No. 3 and No. 4 of Tables 1 and 2 that when the pigment coated phosphors are composed of the same kind of phosphors and pigments, the intensifying screen using a pigment coated phosphor which has a larger amount of pigment particles exhibits higher image quality, but it exhibits lower speed than the intensifying screen using a pigment coated phosphor which has a smaller amount of pigment particles. That is, when the conditions such as coating weight of the fluorescent layer and the like are the same, the image quality and the speed of the intensifying screen in accordance with the present invention depend upon the amount of the pigment particles adhering to the phosphor particles. Therefore, in the intensifying screen of the present invention, the desirable image quality and speed can easily be obtained by selecting the amount of the pigment particles adhering to the phosphor particles. Further, from a comparison of the intensifying screens No. 1 and No. 3 and comparison of the intensifying screens No. 2 and No. 4 of Tables 1 and 2, it is clear that the intensifying screens having the fluorescent layer consisting of an upper layer which contains the pigment coated phosphor particles and a lower layer which contains the conventional phosphor particles (No. 3 and No. 4) exhibit almost the same image quality as that of the intensifying screens having only one fluorescent layer which contains pigment coated phosphor particles (No. 1 and No. 2). The former, however, exhibit markedly higher speed than the latter. It was also confirmed by the experiments of the inventors that intensifying screens having the fluorescent layer consisting of an upper layer which contains phosphor particles to which a larger amount of the pigment particles adhere and an lower layer which contains phosphor particles to which a smaller amount of the pigment particles adhere or the intensifying screens having the fluorescent layer consisting of more than two layers in which the uppermost layer contains phosphor particles to which the largest amount of the pigment particles adhere, the next to the uppermost layer contains phosphor particles to which the second largest amount of the pigment particles adhere and the lower layers contain phosphor particles to which a less amount of the pigment particles adhere exhibited almost the same image quality as that of the intensifying screens having only one fluorescent layer equivalent to said upper layer or said uppermost layer. The former, however, exhibited higher speed than the latter.

The phosphor constituting the pigment coated phosphor employed in the intensifying screen in accordance with the present invention is a radioluminescent phosphor such as $Y_2O_2S$:Tb phosphor, $Gd_2O_2S$:Tb phosphor, $La_2O_2S$:Tb phosphor, $(Y,Gd)_2O_2S$:Tb phosphor, $(Y,Gd)_2O_2S$:Tb,Tm phosphor, $Y_2O_2S$:Eu phosphor, $Gd_2O_2S$:Eu phosphor, $(Y,Gd)_2O_2S$:Eu phosphor, $Y_2O_3$:Eu phosphor, $Gd_2O_3$:Eu phosphor, $(Y,Gd)_2O_3$:Eu phosphor, $YVO_4$:Eu phosphor, $YPO_4$:Tb phoshor, $GdPO_4$:Tb phosphor, $LaPO_4$:Tb phsphor, $YPO_4$:Eu phosphor, LaOBr:Tb phosphor, LaOBr:Tb,Tm phosphor, LaOCl:Tb phosphor, LaOCl:Tb,Tm phosphor, GdOBr:Tb phosphor, GdOCl:Tb phosphor, $CaWO_4$ phosphor, $CaWO_4$:Pb phosphor, $BaSO_4$:Pb phosphor, $BaSO_4$:$Eu^{2+}$ phosphor, $(Ba,Sr)SO_4$:$Eu^{2+}$ phosphor, $Ba_3(PO_4)_2$:$Eu^{2+}$ phosphor, $(Ba,Sr)_3(PO_4)_2$:$Eu^{2+}$ phosphor, BaFCl:$Eu^{2+}$ phosphor, BaFBr:$Eu^{2+}$ phosphor, BaFCl:$Eu^{2+}$,Tb phosphor, BaFBr:$Eu^{2+}$,Tb phosphor, $BaF_2.BaCl_2.KCl$:$Eu^{2+}$ phosphor, $BaF_2.BaCl_2.xBaSO_4.KCl$:$Eu^{2+}$ phosphor, $(Ba,Mg)F_2.BaCl_2.KCl$:$Eu^{2+}$ phosphor, CsI:Na phosphor, CsI:Tl phosphor, NaI phosphor, ZnS:Ag phosphor, (Zn,Cd)S:Ag phosphor, (Zn,Cd)S:Cu phosphor, (Zn,Cd)S:Cu,Al phosphor, (Zn, Cd)S:Au,Al phosphor, $HfP_2O_7$:Cu phosphor, etc.

The pigment particles constituting the pigment coated phosphor employed in the intensifying screen in accordance with this invention are, for example, blue colored pigment particles such as cobalt blue ($CoO.nAl_2O_3$), ultramarine blue ($3NaAl.SiO_2.Na_2S_2$), Berlin blue $\{Fe_4[Fe(CN)_6]_3.nH_2O\}$, cerulean blue ($CoO.nSnO_2$), cupric sulfide (CuS) and other ceramic pigments, green colored pigment particles such as chrome green $\{PbCrO_4+Fe_4[Fe(CN)_6]_3.nH_2O\}$, cobalt green (CoO.nZnO), chromium oxide ($Cr_2O_3$) and other ceramic pigments; orange or yellow colored pigment particles such as basic lead chromate ($PbCrO_4$), chrome yellow ($PbCrO_4$), Chinese yellow ($Fe_2O_3.SiO_2.Al_2O_3$), cadmium yellow (CdS), titanium yellow ($TiO_2$-NiO-$Sb_2O_3$), litharge (PbO), zinc iron yellow (Zn-Fe) and other ceramic pigments; and red colored pigment particles such as cadmium sulfoselenide [Cd(S,Se)], rouge ($Fe_2O_3$), red lead ($Pb_3O_4$), cuprous oxide ($Cu_2O$), cadmium mercury red (CdS+HgS), chrome vermilion ($PbCrO_4.PbSO_4$), red mercury sulfide (HgS), antimony red ($Sb_2S_3$), cupric ferrocyanate [$Cu_2Fe(CN)_6$], iodine red ($HgI_2$), zinc iron red (Zn-Fe) and other ceramic pigments. Solvent resisting organic pigment particles also can be employed. These pigment particles preferably have a mean grain size of not more than 1.0μ in the present invention.

The combination of the phosphor and the pigment particles of the pigment coated phosphor employed in the intensifying screen in accordance with the present invention is preferably selected so that the color of the light emitted by the phosphor is identical with the body color of the pigment particles. As examples of the combinations of the phosphors and the pigment particles, mention may be made of the combination of a blue emitting phosphor such as $Y_2O_2S$:Tb phosphor, $CaWO_4$ phosphor, LaOBr:Tb phosphor, ZnS:Ag phosphor or BaFCl:$Eu^{2+}$ phosphor and blue colored pigment particles such as cobalt blue or ultramarine blue, and the combination of a green emitting phosphor such as $Gd_2O_2S$:Tb phosphor or $La_2O_2S$:Tb phosphor and green colored pigment particles such as cobalt green or chromium oxide, and the combination of a red emitting phosphor such as $Y_2O_2S$:Eu phosphor, $Y_2O_3$:Eu phosphor or $YVO_4$:Eu phosphor and red colored pigment particles such as cadmium sulfoselenide, rouge or red lead. The reflectance of the pigment at the main peak of the emission spectrum of the phosphor which constitutes said pigment coated phosphor is preferably within the range of 20 to 80% when the reflectance of magnesium oxide plate is defined to be 100%. When the reflectance of the pigment is lower than 20%, the speed of the intensifying screen is markedly lowered. While, the image quality is enhanced very little when the reflectance of the pigment is higher than 80%.

In preparing the pigment coated phosphor which is employed in the intensifying screen of the present invention by using the aforementioned phosphor and pigment particles, it is important to have the pigment particles adhere to the surface of the phosphor particles uniformly and firmly. As the process for having the pigment particles adhere to the surface of the phosphor uniformly and firmly are recommended, for instance, a process utilizing an electrostatic coating method, a process utilizing a suspension polymerization method, a process utilizing a copolymerization method and a process using a gelatin-gum arabic mixture as a binder.

Except for the use of a pigment coated phosphor, the intensifying screen of the present invention is prepared by the conventional intensifying screen manufacturing process. That is, a pigment coated phosphor or a mixture of a conventional phosphor and a pigment coated phosphor is mixed with a proper amount of a resinous binder such as nitrocellulose. Then, a proper amount of a solvent is added to the mixture to form a coating dispersion having an optimum viscosity, and then the coating dispersion thus prepared is applied to a support by means of a roll coater, a knife coater or the like followed by drying. Some of the known intensifying screens have a structure wherein a reflective layer, an absorptive layer or a metallic foil is formed between the support and the fluorescent layer.

In this invention also, if necessary, the intensifying screen may have a reflective layer, an absorptive layer or a metallic foil between the support and the fluorescent layer. In preparing such an intensifying screen, a reflective layer, an absorptive layer or a metallic foil is formed on a support beforehand and then the fluorescent layer is formed thereon in the manner described above. In preparing an intensifying screen having a fluorescent layer consisting of a plurality of layers, the layer nearest to the support is first formed in the same manner described above, and then the other layers are formed thereon in the same manner. In addition, upon the formation of the fluorescent layer described above, additives, for example, a dispersing agent for improving the dispersibility of the phosphor or a plasticizer such as dibutyl phthalate, methylphthalyl ethyleneglycol or the like for increasing the plasticity of the intensifying screen obtained may be added to the coating dispersions. Many intensifying screens have a transparent protective layer over the fluorescent layer for protecting the fluorescent layer. In the intensifying screens of the present invention, it is preferable to form a transparent protective layer over the fluorescent layer.

The present invention will hereinbelow be explained more concretely referring to the following examples. It should, however, be understood that the invention is not limited to these examples.

EXAMPLE 1

A coating dispersion having a viscosity of 50 centistokes was prepared by mixing (i) 8 parts by weight of a pigment coated phosphor in which 1.5 parts by weight of cobalt blue pigment particles of a mean grain size of 0.3μ (No. 7546, made by Harshaw Chemical Co., Ltd.) were uniformly and firmly attached to the surfaces of 100 parts by weight of $CaWO_4$ phosphor particles of a mean grain size of 5μ, and (ii) 1 part of nitrocellulose using a solvent mixture (a mixture of acetone, ethyl acetate and butyl acetate of 1:1:8 by weight mixing ratio). The coating dispersion of the pigment coated phosphor particles was uniformly applied to a 250μ thick polyethylene terephthalate support having formed thereon a carbon black absorptive layer at a coating weight of about 40 mg/cm² by means of a knife coater and dried at 50° C. to form a fluorescent layer. Then, a nitrocellulose was further applied uniformly to the fluorescent layer and dried to form a transparent protective layer about 5μ thick.

When the intensifying screen thus prepared was used in combination with a regular type X-ray film, the intensifying screen exhibited higher image quality than the conventional intensifying screen prepared in the same manner as described above except using $CaWO_4$ phosphor to which no cobalt blue pigment particles adhered. (See Table 3)

EXAMPLE 2

A coating dispersion of $CaWO_4$ phosphor particles of a mean grain size of 5μ was prepared in the same manner as described in Example 1. The coating dispersion was uniformly applied to a 250μ thick polyethylene telephthalate support at a coating weight of about 30 mg/cm² by means of a knife coater to form a fluorescent layer of the $CaWO_4$ phosphor.

Then, a coating dispersion of pigment coated phosphor particles in which 2.0 parts by weight of cobalt blue pigment particles of a mean grain size of 0.3μ (No. 7546, made by Harshaw Chemical Co., Ltd.) were uniformly and firmly attached to the surfaces of 100 parts by weight of the aforementioned $CaWO_4$ phosphor particles was prepared in the same manner as described in Example 1. The coating dispersion was uniformly applied to the aforementioned undried fluorescent layer of the $CaWO_4$ phosphor at the coating weight of about 10 mg/cm$^2$ by means of a knife coater to form a fluorescent layer of the pigment coated phosphor on the fluorescent layer of the $CaWO_4$ phosphor and then both these fluorescent layers thus formed were dried at 50° C. Furthermore, a nitrocellulose was applied uniformly to the fluorescent layer of the pigment coated phosphor and dried to form a transparent protective layer about 5μ thick.

When the intensifying screen thus prepared was used in combination with a regular type X-ray film, the intensifying screen exhibited higher image quality than the conventional intensifying screen prepared in the same manner as described above in which only one fluorescent layer of the $CaWO_4$ phosphor to which no cobalt blue pigment particles adhered was formed at the coating weight of about 40 mg/cm$^2$. (See Table 3)

EXAMPLE 3

A coating dispersion of $BaFCl:Eu^{2+}$ phosphor particles of a mean grain size of 6μ was prepared in the same manner as described in Example 1. The coating dispersion was uniformly applied to a 250μ thick polyethylene telephthalate support at a coating weight of about 30 mg/cm$^2$ by means of a knife coater to form a fluorescent layer of the $BaFCl:Eu^{2+}$ phosphor.

Then, a coating dispersion of pigment coated phosphor particles in which 1.0 part by weight of cobalt blue pigment particles of a mean grain size of 0.3μ (No. 7546, made by Harshaw Chemical Co., Ltd.) were uniformly and firmly attached to the surfaces of 100 parts by weight of $CaWO_4$ phosphor particles of a mean grain size of 5μ was prepared in the same manner as described in Example 1. The coating dispersion was uniformly applied to the aforementioned undried fluorescent layer of the $BaFCl:Eu^{2+}$ phosphor at the coating weight of about 10 mg/cm$^2$ by means of a knife coater to form a fluorescent layer of the pigment coated phosphor on the fluorescent layer of the $BaFCl:Eu^{2+}$ phosphor and then both these fluorescent layers thus formed were dried at 50° C. Furthermore, a nitrocellulose was applied uniformly to the fluorescent layer of the pigment coated phosphor and dried to form a transparent protective layer about 5μ thick.

When the intensifying screen thus prepared was used in combination with a regular type X-ray film, the intensifying screen exhibited higher image quality than the conventional intensifying screen prepared in the same manner as described above except using $CaWO_4$ phosphor to which no cobalt blue pigment particles adhered. (See Table 3)

EXAMPLE 4

A coating dispersion of ZnS:Ag phosphor particles of a mean grain size of 8μ was prepared in the same manner as described in Example 1. The coating dispersion was uniformly applied to a 250μ thick polyethylene telephthalate support at a coating weight of about 25 mg/cm$^2$ by means of a knife coater to form a fluorescent layer of the ZnS:Ag phosphor.

Then, a coating dispersion of pigment coated phosphor particles in which 1.0 part by weight of ultramarine blue pigment particles of a mean grain size of 0.8μ (No. 3000, made by Daiichi Kasei Kogyo Co., Ltd.) were uniformly and firmly attached to the surfaces of 100 parts by weight of the aforementioned ZnS:Ag phosphor particles was prepared in the same manner as described in Example 1. The coating dispersion was uniformly applied to the aforementioned undried fluorescent layer of the ZnS:Ag phosphor at the coating weight of about 15 mg/cm$^2$ by means of a knife coater to form a fluorescent layer of the pigment coated phosphor on the fluorescent layer of the ZnS:Ag phosphor and then both these fluorescent layers thus formed were dried at 50° C. Furthermore, a nitrocellulose was applied uniformly to the fluorescent layer of the pigment coated phosphor and dried to form a transparent protective layer about 5μ thick.

When the intensifying screen thus prepared was used in combination with a regular type X-ray film, the intensifying screen exhibited higher image quality than the conventional intensifying screen prepared in the same manner as described above in which only one fluorescent layer of the ZnS:Ag phosphor to which no ultramarine blue pigment particles adhered was formed at the coating weight of about 40 mg/cm$^2$. (See Table 3)

EXAMPLE 5

A coating dispersion of $Y_2O_2S:Tb$ phosphor particles of a mean grain size of 7μ was prepared in the same manner as described in Example 1. The coating dispersion was uniformly applied to a 250μ thick polyethylene telephthalate support at a coating weight of about 30 mg/cm$^2$ by means of a knife coater to form a fluorescent layer of the $Y_2O_2S:Tb$ phosphor.

Then, a coating dispersion of pigment coated phosphor particles in which 0.5 parts by weight of cobalt blue pigment particles of a mean grain size of 0.3μ (No. 7546, made by Harshaw Chemical Co., Ltd.) were uniformly and firmly attached to the surfaces of 100 parts by weight of the aforementioned $Y_2O_2S:Tb$ phosphor particles was prepared in the same manner as described in Example 1. The coating dispersion was uniformly applied to the aforementioned undried fluorescent layer of the $Y_2O_2S:Tb$ phosphor at the coating weight of about 10 mg/cm$^2$ by means of a knife coater to form a fluorescent layer of the pigment coated phosphor on the fluorescent layer of the $Y_2O_2S:Tb$ phosphor.

Then, a coating dispersion of pigment coated phosphor particles in which 2.0 parts by weight of the aforementioned cobalt blue pigment particles were uniformly and firmly attached to the surfaces of 100 parts by weight of the aforementioned $Y_2O_2S:Tb$ phosphor particles was prepared in the same manner as described in Example 1. The coating dispersion was uniformly applied to the aforementioned undried fluorescent layer of the pigment coated phosphor at the coating weight of about 10 mg/cm$^2$ by means of a knife coater to form a fluorescent layer of the pigment coated phosphor on the aforementioned two fluorescent layers and then these three fluorescent layers were dried at 50° C. Furthermore, a nitrocellulose was applied uniformly to the uppermost fluorescent layer and dried to form a transparent protective layer about 5μ thick.

When the intensifying screen thus prepared was used in combination with an ortho type X-ray film, the intensifying screen exhibited higher image quality than the conventional intensifying screen prepared in the same manner as described above in which only one fluorescent layer of the $Y_2O_2S:Tb$ phosphor to which no cobalt blue pigment particles adhered was formed at the coating weight of about 50 mg/cm$^2$. (See Table 3)

EXAMPLE 6

A coating dispersion of $Gd_2O_2S:Tb$ phosphor particles of a mean grain size of 6μ was prepared in the same manner as described in Example 1. The coating dispersion was uniformly applied to a 250μ thick polyethylene telephthalate support at a coating weight of about 30 $mg/cm^2$ by means of a knife coater to form a fluorescent layer of the $Gd_2O_2S:Tb$ phosphor.

Then, a coating dispersion of pigment coated phosphor particles in which 1.0 part by weight of chromium oxide pigment particles of a mean grain size of 0.4μ were uniformly and firmly attached to the surfaces of 100 parts by weight of the aforementioned $Gd_2O_2S:Tb$ phosphor particles was prepared in the same manner as described in Example 1. The coating dispersion was uniformly applied to the aforementioned undried fluorescent layer of the $Gd_2O_2S:Tb$ phosphor at the coating weight of about 15 $mg/cm^2$ by means of a knife coater to form a fluorescent layer of the pigment coated phosphor on the fluorescent layer of the $Gd_2O_2S:Tb$ phosphor and then both these fluorescent layers thus formed were dried at 50° C. Furthermore, a nitrocellulose was applied uniformly to the fluorescent layer of the pigment coated phosphor and dried to form a transparent protective layer about 5μ thick.

When the intensifying screen thus prepared was used in combination with an ortho type X-ray film, the intensifying screen exhibited higher image quality than the conventional intensifying screen prepared in the same manner as described above in which only one fluorescent layer of the $Gd_2O_2S:Tb$ phosphor to which no chromium oxide pigment particles adhered was formed at the coating weight of about 45 $mg/cm^2$. (See Table 3)

Table 3

| Example No. | type of intensifying screen | sharpness (MTF value) | granularity (RMS value) | relative speed (%) |
|---|---|---|---|---|
| 1 | present invention | 0.65 | $1.00 \times 10^{-1}$ | 72 |
| | conventional type | 0.55 | $1.05 \times 10^{-1}$ | 100 |
| 2 | present invention | 0.64 | $1.01 \times 10^{-1}$ | 96 |
| | conventional type | 0.55 | $1.05 \times 10^{-1}$ | 100 |
| 3 | present invention | 0.50 | $1.10 \times 10^{-1}$ | 90 |
| | conventional type | 0.45 | $1.30 \times 10^{-1}$ | 100 |
| 4 | present invention | 0.48 | $1.30 \times 10^{-1}$ | 80 |
| | conventional type | 0.40 | $1.55 \times 10^{-1}$ | 100 |
| 5 | present invention | 0.51 | $1.18 \times 10^{-1}$ | 70 |
| | conventional type | 0.40 | $1.38 \times 10^{-1}$ | 100 |
| 6 | present invention | 0.53 | $1.05 \times 10^{-1}$ | 90 |
| | conventional type | 0.48 | $1.15 \times 10^{-1}$ | 100 |

The sharpness is represented by MTF value at a spacial frequency of 2 lines/mm, the granularity is represented by RMS value at a radiographic density of 0.8 and a spacial frequency of 0–5 lines/mm, and the spced is represented by a relative value with reference to that of the conventional intensifying screen of each Example defined to be 100.

We claim:

1. A radiographic intensifying screen comprising a support having applied thereon a fluorescent layer containing a pigment coated phosphor wherein pigment particles adhere to the surface of a phosphor and partly absorb the light emitted by said phosphor wherein the reflectance of said pigment at the main peak of the emission spectrum of said phosphor is within the range of 20 to 80% when the reflectance of magnesium oxide plate is defined to be 100%.

2. A radiographic intensifying screen as in claim 1 wherein said pigment coated phosphor is dispersed in a binder.

3. A radiographic intensifying screen as claimed in claim 1 wherein said fluorescent layer consists of a plurality of layers in which the uppermost layer contains phosphor particles to which the largest amount of the pigment particles adhere, the next to the uppermost layer contains phosphor particles to which the second largest amount of said pigment particles adhere and the lower layers contain phosphor particles to which a less amount of said pigment particles adhere.

4. A radiographic intensifying screen as in claim 3 where the lowest layer contains phosphor particles to which no pigment particles adhere.

5. A radiographic intensifying screen as claimed in claim 3 wherein said fluorescent layer consists of two layers in which the lower layer contains phosphor particles to which no pigment particles adhere.

* * * * *